Aug. 7, 1956 R. F. BASKIN ET AL 2,758,160

D.C. AMPLIFIER

Filed June 10, 1954 2 Sheets-Sheet 1

INVENTOR.
ROBERT F. BASKIN
ARLING DIX BROWN, JR.
BY Max L. Wynore
AGENT

Aug. 7, 1956 R. F. BASKIN ET AL 2,758,160

D.C. AMPLIFIER

Filed June 10, 1954 2 Sheets-Sheet 2

INVENTOR.
ROBERT F. BASKIN
ARLING DIX BROWN, JR.
BY Max L. Wymore
AGENT

United States Patent Office 2,758,160

Patented Aug. 7, 1956

2,758,160

D. C. AMPLIFIER

Robert F. Baskin, South Euclid, and Arling Dix Brown, Jr., East Cleveland, Ohio, assignors to Clevite Corporation, Cleveland, Ohio, a corporation of Ohio Application June 10, 1954, Serial No. 435,758

4 Claims. (Cl. 179—171)

This invention relates to a direct coupled power amplifier. It further relates to amplifiers capable of operating over a wide range of frequencies with a minimum amount of distortion and having a high impedance input operating into a low impedance output circuit.

An important object of the invention is to provide balance in the output stage.

An important object is to have each output tube carry approximately one half of the signal current during its operative cycle.

Another important object is that under varying conditions of signal level to have each output tube operate over the same effective load line for the tube operating characteristic curves to provide a linear amplified image of the input signal.

A further object is the amplification of currents or voltages from D. C. to several thousand cycles and higher with negligible phase shift.

A further object is to provide an amplifier having an input impedance on the order of 0.1 megohm or more and an output impedance on the order of 10 to 2000 ohms.

The invention is more fully described in the following specification, with reference to the accompanying drawing and is defined in the appended claims.

Fig. 1 is a circuit diagram of a preferred embodiment of the invention. For convenience and brevity the usual and conventional sources of current for cathode heaters in the amplifying tubes and other conventional circuit components have been omitted from the diagram.

Fig. 1*a* is an alternative arrangement of a portion of the circuit of Fig. 1 to compensate for high frequency response.

Figure 1:
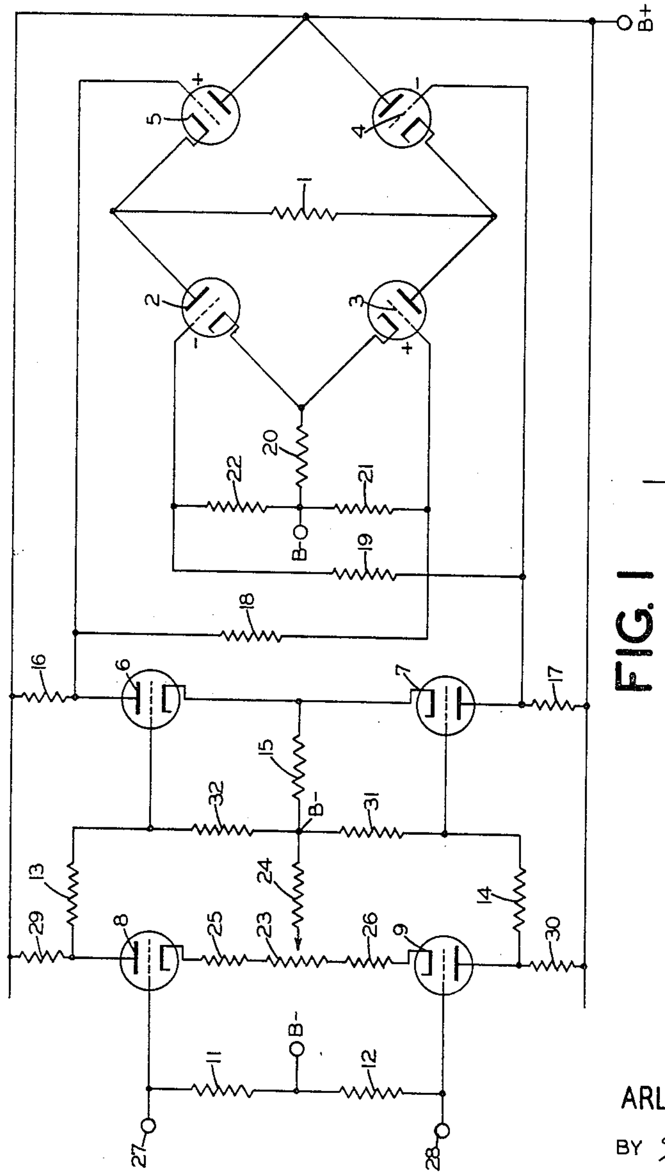

The heart of the invention lies in the output stage and the drive therefor. Referring to Fig. 1, it can be seen that the output circuit is basically a four arm bridge with electronic amplifying devices 2 to 5 comprising at least a plate, cathode and grid forming the four active arms. The output stage is driven by a pair of balanced amplifiers 6 and 7 which are driven by a second pair of balanced amplifiers 8 and 9. The grids of amplifiers 8 and 9 are driven by a balanced input usually of high impedance.

The first pair of electronic amplifying devices 4 and 5, are connected at their plates and the second pair of electronic amplifying devices, 2 and 3, are connected at their cathodes. The cathodes of the first pair of electronic amplifying devices are connected respectively to the plates of the second pair of electronic amplifying devices. A load 1 is connected between the plate-cathode junction of the two pairs. A current source is connected between the plate junction of the first pair and the cathode junction of the second pair through a cathode resistor 20.

The plates of electronic amplifying devices 6, 7, 8, and 9 are connected to the same current source mentioned above through plate load resistors 16, 17, 29 and 30 respectively. The cathodes of electronic amplifying devices 6 and 7 are connected together to the current source through a common resistor 15 and the cathodes of electronic amplifying devices 8 and 9 are connected together through resistors 25, 26 and potentiometer 23; the slider of which is connected to the current source through resistor 24. The potentiometer 23 permits the balancing of electronic amplifying devices 8 and 9, whose balance affects the balancing of the following stages.

In operation a push-pull signal is applied to the grids of electronic amplifying devices 8 and 9 developing a signal voltage across resistors 11 and 12. The output of electronic amplifying devices 8 and 9 is delivered to a voltage divider resistive coupling network 13, 32 and 14, 31 in which signal voltages for electronic amplifying devices 6 and 7 are impressed on resistors 32 and 31 and the grids of electronic amplifying devices 6 and 7. Electronic amplifying devices 6 and 7 deliver output to resistors 16 and 17 and to the grids of electronic amplifying devices 5 and 4. The output from electronic amplifying devices 6 and 7 is further delivered to voltage dividing resistive coupling network 18, 21, and 19, 22 where signal voltages are impressed on resistors 21 and 22 and on the grids of electronic amplifying devices 3 and 2 respectively. The grids of electronic amplifying devices 3 and 2 are cross-coupled to the plates of 6 and 7 to obtain proper polarity.

Each of the resistance values of 11, 12; 25, 26; 13, 14; 31, 32; 29, 30; 16, 17; 18, 19; and 21, 22 are equal to each other. The ratios of resistance 18 to 21 and 19 to 22 are such that the signal voltage applied to the grids of electronic amplifying devices 2 and 3 produces the same amplitude of grid to cathode variation from bias as the signal voltage impressed on the grids of triodes 4 and 5. The variation in 2 and 4 will be opposite in polarity to that in 3 and 5.

The plates of electronic amplifying devices 8 and 9 are directly coupled to the grids of electronic amplifying devices 6 and 7, whose plates are directly coupled to the grids of electronic amplifying devices 2 to 5. This arrangement avoids phase shift and variation of impedance to signals of widely varying frequency such as usually encountered in coupling condensers or other coupling devices.

Figure 1A:
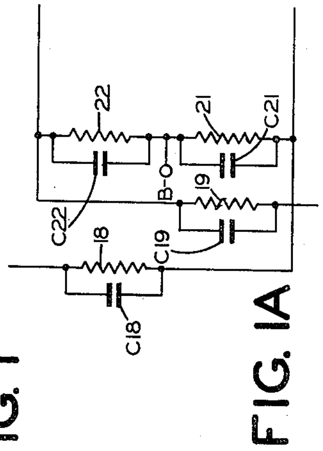

Referring to Fig. 1*a*, there is shown an alternative arrangement of a portion of the circuit of Fig. 1 providing for compensating high frequency droop when amplifying signals in the frequency region where input capacities and wiring capacities must be considered. The voltage dividing resistors 18, 19, 21 and 22 are shunted with capacitances C–18, C–19, C–21 and C–22 respectively to provide compensation. The values of these capacitors are chosen to give substantially the same ratio of voltage division at these high frequencies as offered by the pure resistance of the voltage dividers at the lower frequencies. Likewise compensating capacitances may be placed in shunt with voltage divider resistors 13, 14, 31 and 32.

Figure 2:
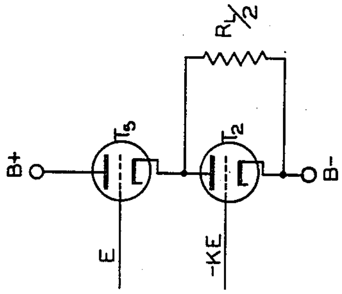
Fig. 2 shows the equivalent of one half of the output stage bridge.
Figure 4:
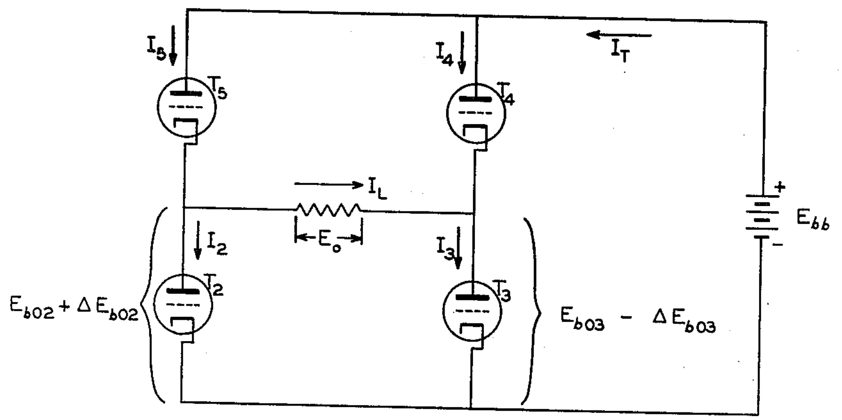
Fig. 4 is a graphic illustration of the invention.

Referring to Fig. 2, which shows the equivalent of one half of the bridge of Fig. 4, E is the input voltage applied to $T_5$. By means of the cross-coupling shown in Fig. 1, —KE is the applied voltage between grid and cathode for $T_2$. K is a constant and its value is determined by particular circuit values and vacuum tube parameters.

Using the principle of superposition, the equivalent circuit for $T_2$ is that of an ordinary plate loaded triode looking into one half of the bridge load resistance $R_L$ shunted by the cathode to B— impedance of $T_5$. The voltage across the load resistance as a function of $-KE$ then is given by:

$$Eo_2=\frac{NKR_LE_1}{R_L(N+2)+2rp}$$

where $Eo_2$=Output voltage for $T_2$ (plate to cathode voltage)
$N$=Amplification factor of $T_2$
$-KE_1$=Input voltage for $T_2$ (grid to cathode voltage)
$R_L$=Load resistance
$rp$=Dynamic plate resistance of $T_2$ at the operating point.
$T_5$=Considered alone is a cathode follower with $RL/2$ shunted by the plate resistance of $T_2$ forming the load. The output voltage as a function of E is given by:

$$Eo_5=\frac{NR_LE_1}{R_L(N+2)+2rp}$$

where $Eo_5$=Output voltage for $T_5$ (plate $T_2$ to cathode $T_2$ voltage)
$N$=Amplification factor of $T_5$
$E_1$=Input voltage for $T_5$ (grid of $T_5$ to $-B$)
$R_L$=Load resistance
$rp$=Dynamic plate resistance of $T_5$ at the operating point.

The total output voltage E$o$ is the sum of the individual voltages. The final expression resulting from their addition is:

$$Eo=\frac{N(1+K)E_1R_L}{R_L(N+2)+2rp}$$

Figure 3:
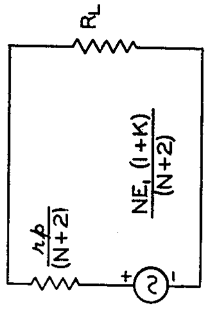
Fig. 3 is an equivalent series circuit of Fig. 2.

From the above equation, the equivalent circuit can be drawn and is shown in Fig. 3.

Here:

$$A=\frac{NR_L(1+K)}{R_L(N+2)+2rp}$$

where:

$A$=Amplification
$N$=Amplification factor
$K$=Attenuation factor
$R_L$=Load resistance
$rp$=Plate resistance and:

$$Ro=\frac{rp}{N+2}$$

where:

$Ro$=Equivalent output resistance

The analytical method gives the means of determining an expression for K. K must have a value such that the grid to cathode voltage of $T_5$ will be equal to the grid to cathode voltage of $T_2$ under static conditions and the change from the value will be equal and opposite in $T_2$ and in $T_5$ respectively under dynamic conditions to achieve maximum efficiency.

Thus:

$eg_5=-KE_1$
$eg_2=E_1-Eo$ where:

$eg_5$=Grid to cathode voltage for $T_5$
$eg_2$=Grid to cathode voltage for $T_2$ and:

$$-K=\frac{R_L+rp}{R_L(N+1)+rp}$$

With reference to Fig. 1, the value determined for K is set by the ratio of the values chosen for the grid return dividing resistors 21 and 22 and 18 and 19. The sign of K is obtained by cross-coupling and feeding the output stage from a balanced amplifier. K may assume any value less than about ½ and greater than zero depending on the characteristics of the amplifying devices used and the resistance of the load. Using 6T4 triodes with a load of 1500 ohms the preferred value of K is about 1/5. Using 6AF4 triodes with the same load the preferred value of K is about 1/7.

The primary point of novelty of the invention over prior art circuitry, King 2,590,104, in recognizing that the lower pair of triodes 2 and 3 do not require as much drive as the upper pair of triodes, 4 and 5, is the use of cross-coupling and the use of voltage divider values such that the grid to cathode voltage will be of substantially equal magnitude in each triode of the bridge under dynamic conditions and operate from substantially the same quiescent operating point. Thus as signals are applied to the bridge, the grid to cathode swing will be equal in magnitude in each triode. Otherwise the lower pair of triodes would operate over a different portion of the characteristic curve than the upper pair and would be driven to cut off and grid current regions with relatively small amounts of input signal.

In a graphical analysis of the invention, it is assumed that all tubes have identical characteristics and operate at the same quiescent operating point. As shown by the above equivalent circuit analysis of the bridge all tube gride to cathode potentials change the same amount under the influence of external signals applied in phase to $T_5$ and $T_4$ and 180 degrees out of phase to $T_2$ and $T_3$ of Fig. 4. The assumptions made above do not depart too greatly from conditions met in actual practice.

The ultimate purpose of the graphical approach is to relate the action of the composite bridge to one set of plate family characteristic curves and one triode, however other electronic amplifier devices, as well as transistors are suitable.

Referring to Fig. 4 in the drawings, initially the load current $I_L$ is zero and all plate to cathode potentials are $$\frac{Ebb}{2}$$

The static input current, $I_T=I_4+I_5$. Under static conditions $I_4=I_3=I_5=I_2$. Under dynamic conditions, by inspection, $Eo=(Ebo_2+\Delta Ebo_2-(Ebo_3-\Delta Ebo_3)$ where E$bo_2$ and E$bo_3$ are the static plate to cathode voltages of tubes 2 and 3 respectively. Also under dynamic conditions, by inspection $I_L=(I_5+\Delta I_5)-(I_3-\Delta I_3)$. Where $\Delta I_3$, and $\Delta I_5$ are the change of plate current from static in $T_3$, and $T_5$, respectively. Since identical tube characteristics are assumed, $Eo=2\Delta Ebo$ and $I_L=2\Delta I$. Where $\Delta 1$ is total change of plate current from static in any one triode. $I_L$ approaches $I_T$ as a limit and E$bo$ approaches E$bb$ as a limit.

When as an example a 6T4 triode is used in this circuit with a 200 volt B supply and with the bias set at $-6$ volts, the static plate current in each of the series branches will be 14 milliamperes for a total input current of 28 milliamperes. Various output voltages can now be assumed to exist across the load resistance, which in the example is taken to be 1500 ohms. Using the assumed output voltages, the necessary plate voltages and tube currents that must exist to cause the assumed output voltages can be calculated and are as shown in Table I.

*Table I*

Plate voltages and tube currents required for 6T4 triodes driving a load of 1500 ohms.

| E$o$ volts | E$b$T$_5$ volts | E$b$T$_3$ volts | E$b$T$_4$ volts | E$bT_2$ volts | $I_2$ ma. | $I_3$ ma. | $I_4$ ma. | $I_5$ ma. | $I_L$ ma. |
|---|---|---|---|---|---|---|---|---|---|
| 0 | 100 | 100 | 100 | 100 | 14 | 14 | 14 | 14 | 0 |
| 10 | 95 | 95 | 105 | 105 | 11.5 | 16.5 | 11.5 | 16.5 | 5 |
| 20 | 90 | 90 | 110 | 110 | 9 | 19 | 9 | 19 | 10 |
| 30 | 85 | 85 | 115 | 115 | 6.5 | 24 | 6.5 | 24 | 20 |
| 56 | 44 | 44 | 156 | 156 | 0 | 28 | 0 | 28 | 28 |

Figure 5:
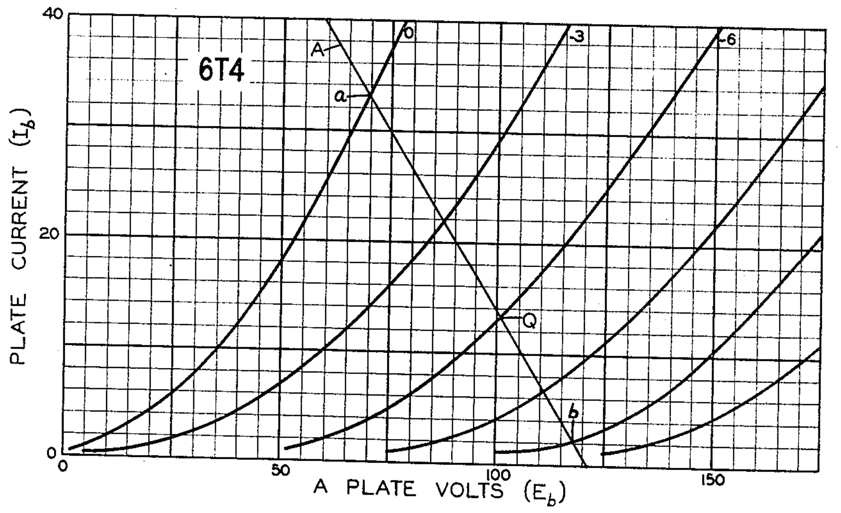
Fig. 5 shows the load line of the invention as applied to the operating characteristic curves of a 6T4 triode for a resistance load.

The values in Table I can be plotted upon the characteristic curves for the 6T4 triode as shown in Fig. 5 of the drawings.

Curve A is the actual excursion of the single tube grid to cathode voltage. It is a straight line passing through the operating point designated as Q.

From curve A, it can be seen that if a grid to cathode bias too close to zero is used point *a* of Fig. 5, the plate dissipation may be exceeded or the grid may be driven positive and grid current caused to flow. If the operating point is too near the other end of the load line, point *b* of Fig. 5, non linear distortion is increased and tubes $T_2$ to $T_5$ may be driven to plate current cut off with relatively small signal voltages. Operating point Q represents a good compromise since it allows large voltage swings in both directions with low distortion. The curve of Fig. 5 further shows that 100% transfer to static plate current to load current is indicated. The choice of operating point depends upon maximum load current requirements and maximum allowable distortion. In one application where the B supply voltage is 213 volts and the total input current 25 milliamperes with an operating bias of approximately −5 volts, the efficiency of transfer is about 80%.

The required signal voltage for a chosen operating point to produce a given output voltage can be plotted upon curve A of Fig. 5. A convenient method of plotting this input signal consists of determining the amplitude of the signal voltage at each inter-section of the load line and the tube characteristic lines. The instantaneous values of $Ein$ may be found from the relation:

$$Ein = eg - E_{cc} + \frac{Eo}{2}$$

where:

$Ein$=Input signal voltage
$eg$=Grid to cathode voltage
$E_{cc}$=Static bias
$Eo$=Output voltage Thus the invention applies signal voltages of lesser amplitude to the lower pair of triodes 2 and 3, however the grid to cathode voltage change from the quiescent operating point is equal in each of the triodes 2 to 5. The plate to cathode voltages must be equal for all triodes 2 to 5 to achieve maximum efficiency in linear push-pull operation. The plate currents in triodes 2 to 5 are each equal for the no signal condition and with signal applied, the change in plate currents is equal. The grid biases of triodes 2 to 5 are equal under static conditions and the change in grid to cathode voltages is of equal magnitude with signal applied. The voltages in actual practice will be subject to some slight variation due to differences in tube characteristics.

When the input signal is zero there is no current through load 1 due to the equalities of voltages and currents existing in the bridge. The circuit is extremely stable because of push-push, push-pull operation and balanced drive using common cathode resistors 15, 20 and 23. These resistors provide self compensation and allow for minor variations which may exist in tube characteristics.

While there have been described what are at present considered to be the preferred embodiments of this invention, it will be obvious to those skilled in the art that various changes and modifications may be made therein without departing from the invention, and it is therefore, aimed in the appended claims to cover all such changes and modifications as fall within the true spirit and scope of the invention.

We claim:

1. In an amplifying circuit the combination of a pair of driver amplifiers connected push-pull and an output circuit comprising a four arm bridge with four electronic amplifying devices forming the active arms of the bridge, the first pair of bridge amplifying devices being connected by their plates and the second pair of bridge amplifying devices being connected by their cathodes, the cathodes of the first pair being respectively connected to the plates of the second pair, a current source connected to the plate junction of the first pair and to the cathode junction of the second pair, an output load connected between the plate-cathode junctions of the first and second pair, the pair of push-pull driver amplifying devices providing means for exciting each grid of a bridge pair in opposite phase, said push-pull driver amplifying devices comprising a pair of electronic amplifying devices with their cathodes connected together, the cathodes and plates of the push-pull amplifying devices being connected through resistors to the same current source mentioned above a direct connection from the plate of one push-pull amplifying device to the grid of one of the bridge amplifying devices in said first pair, a first voltage divider network having a predetermined ratio of voltage division connected between the plate of said one push-pull amplifying device and the grid of the bridge amplifying device in said second pair opposite said one bridge amplifying device in said first pair, a direct connection from the plate of the other push-pull amplifying device to the grid of the other of the bridge amplifying devices in said first pair, and a second voltage divider network having the same voltage division ratio as said first divider network connected between the plate of said other push-pull amplifying device to the grid of the other bridge amplifying device of said second pair wherein the voltage division ratio of said divider networks is chosen such that the magnitude of the signal applied to the grids of the second pair of bridge amplifying devices is greater than zero and less than about ½ of that applied to the grids of the first pair of bridge amplifying devices.

2. The amplifying circuit of claim 1 wherein the voltage division ratio is such that the magnitude of the signal applied to the grids of the second pair of bridge amplifying devices is from about 1/3 to about 1/7 of that applied to the grids of the first pair of bridge amplifying devices.

3. The amplifying circuit of claim 1 wherein the voltage division ratio is chosen such that the cathode to grid voltages of each of the bridge amplifying devices are substantially equal under no signal conditions and change substantially the same amount under signal conditions.

4. The amplifying circuit of claim 1 wherein the voltage divider network elements are resistors each shunted with a capacitance to provide high frequency compensation.

References Cited in the file of this patent

UNITED STATES PATENTS 2,590,104 King ---------------- Mar. 25, 1952